US012741218B1

(12) United States Patent
Grandprey-Shores et al.

(10) Patent No.: US 12,741,218 B1
(45) Date of Patent: Sep. 22, 2026

(54) MULTI-SOURCE DISRUPTIVE BEHAVIOR EVALUATION AND MODERATION SYSTEM

(71) Applicant: Riot Games, Inc., Los Angeles, CA (US)

(72) Inventors: Kate Elizabeth Grandprey-Shores, Bellevue, WA (US); Galen Caldwell, Seattle, WA (US); Yakov Baytler, Los Angeles, CA (US); Jessica Hayley Luke, Seattle, WA (US)

(73) Assignee: RIOT GAMES, INC., Los Angeles, CA (US)

( * ) Notice: Subject to any disclaimer, the term of this patent is extended or adjusted under 35 U.S.C. 154(b) by 132 days.

(21) Appl. No.: 18/434,717

(22) Filed: Feb. 6, 2024

(51) Int. Cl.
*A63F 13/79* (2014.01)
*A63F 13/215* (2014.01)
*G10L 15/06* (2013.01)
*G10L 25/63* (2013.01)

(52) U.S. Cl.
CPC ............ *A63F 13/79* (2014.09); *A63F 13/215* (2014.09); *G10L 15/063* (2013.01); *G10L 25/63* (2013.01)

(58) Field of Classification Search
CPC ...... A63F 13/79; A63F 13/215; G10L 15/063; G10L 15/63
See application file for complete search history.

(56) References Cited

U.S. PATENT DOCUMENTS 5,978,452 A 11/1999 Cho
7,379,421 B1 5/2008 Gao et al.
7,961,854 B1 6/2011 Ho et al.
8,366,553 B2 * 2/2013 Kim ........................ A63F 13/75 463/29
8,700,411 B2 4/2014 Price et al.
9,120,019 B2 * 9/2015 Mescon .................. A63F 13/35
9,405,741 B1 8/2016 Schaaf et al.
(Continued)

FOREIGN PATENT DOCUMENTS

CN 103098050 B 5/2017
CN 112784016 A 5/2021
(Continued)

OTHER PUBLICATIONS

Notice of Allowance received for U.S. Appl. No. 18/434,737, mailed on Aug. 20, 2025, 10 pages.
(Continued)

*Primary Examiner* — Malina D. Blaise
(74) *Attorney, Agent, or Firm* — Shook, Hardy & Bacon L.L.P.

(57) ABSTRACT

Embodiments of the present disclosure provide systems, methods, and computer storage media directed to the identification and moderation of various types of disruptive behaviors. Multiple evaluation systems, each employing distinct methodologies and algorithms, are employed to identify various types of disruptive behaviors. This diversified approach recognizes the strengths and limitations of individual evaluation systems, allowing for a more nuanced and comprehensive detection of disruptive speech. Embodiments rely on the aggregation and analysis of evaluation results from diverse sources, leveraging the strengths of each system, and facilitating a superior means for identifying different disruptive behaviors for purposes of moderation.

20 Claims, 9 Drawing Sheets

(56) References Cited

U.S. PATENT DOCUMENTS

| | | | | |
|---|---|---|---|---|
| 9,533,218 | B1 * | 1/2017 | Lin | A63F 13/00 |
| 10,922,357 | B1 * | 2/2021 | Chennuru | G06F 16/2457 |
| 11,023,688 | B1 * | 6/2021 | Holmdahl | G06F 40/30 |
| 11,065,547 | B2 * | 7/2021 | Lin | A63F 13/795 |
| 11,405,436 | B1 | 8/2022 | Mindlin et al. | |
| 11,654,363 | B1 * | 5/2023 | Rainbolt | A63F 13/90 463/31 |
| 11,801,449 | B2 | 10/2023 | Perlman et al. | |
| 2003/0177008 | A1 | 9/2003 | Chang | |
| 2005/0037739 | A1 | 2/2005 | Zhong | |
| 2005/0041786 | A1 | 2/2005 | Craig | |
| 2007/0032225 | A1 | 2/2007 | Konicek et al. | |
| 2007/0265073 | A1 | 11/2007 | Novi et al. | |
| 2008/0077517 | A1 * | 3/2008 | Sappington | G06Q 30/02 709/204 |
| 2009/0116403 | A1 | 5/2009 | Callanan et al. | |
| 2009/0170604 | A1 * | 7/2009 | Mueller | A63F 13/792 463/42 |
| 2010/0023336 | A1 | 1/2010 | Shmunk | |
| 2011/0202355 | A1 | 8/2011 | Grill et al. | |
| 2011/0300884 | A1 | 12/2011 | Ollila et al. | |
| 2012/0179982 | A1 | 7/2012 | Gandhi et al. | |
| 2013/0041655 | A1 * | 2/2013 | Spears | G06F 16/9535 704/9 |
| 2013/0151740 | A1 | 6/2013 | Bouknight et al. | |
| 2014/0270196 | A1 | 9/2014 | Braho et al. | |
| 2015/0005073 | A1 | 1/2015 | Cudak et al. | |
| 2016/0286599 | A1 | 9/2016 | Weingertner et al. | |
| 2017/0199934 | A1 | 7/2017 | Nongpiur et al. | |
| 2017/0225079 | A1 * | 8/2017 | Conti | A63F 13/35 |
| 2018/0130092 | A1 | 5/2018 | Nahass et al. | |
| 2020/0098373 | A1 | 3/2020 | Fujita et al. | |
| 2020/0160845 | A1 * | 5/2020 | Lavilla | G10L 15/005 |
| 2020/0175972 | A1 | 6/2020 | Fan et al. | |
| 2020/0236154 | A1 | 7/2020 | Ragot et al. | |
| 2021/0370183 | A1 * | 12/2021 | Dorn | A63F 13/79 |
| 2021/0370188 | A1 * | 12/2021 | Thomas | A63F 13/355 |
| 2022/0032199 | A1 * | 2/2022 | Rudi | G06N 20/00 |
| 2022/0043938 | A1 | 2/2022 | Kochura et al. | |
| 2022/0054946 | A1 | 2/2022 | Degarmo et al. | |
| 2022/0115032 | A1 * | 4/2022 | Iwagaki | G06F 16/35 |
| 2022/0115033 | A1 * | 4/2022 | Huffman | G06N 3/045 |
| 2022/0293097 | A1 | 9/2022 | Jekeswaran | |
| 2022/0335959 | A1 * | 10/2022 | Sharma | G10L 19/02 |
| 2022/0392437 | A1 * | 12/2022 | Moschella | G10L 15/22 |
| 2023/0057442 | A1 | 2/2023 | Stasior et al. | |
| 2023/0156569 | A1 | 5/2023 | Breaux et al. | |
| 2023/0321546 | A1 * | 10/2023 | Huffman | G10L 15/19 |
| 2023/0381672 | A1 | 11/2023 | Henderson et al. | |
| 2023/0395065 | A1 | 12/2023 | Huffman et al. | |
| 2023/0396457 | A1 * | 12/2023 | Huffman | H04L 12/1822 |
| 2024/0296858 | A1 | 9/2024 | Huffman et al. | |
| 2025/0069596 | A1 * | 2/2025 | Nandwana | G10L 15/16 |

FOREIGN PATENT DOCUMENTS

| | | | |
|---|---|---|---|
| CN | 112837677 | A | 5/2021 |
| IN | 39/2023 | A | 9/2023 |
| JP | 2020-123204 | A | 8/2020 |
| KR | 10-2019-0141883 | A | 12/2019 |
| KR | 10-2023-0169680 | A | 12/2023 |
| WO | 2023/096309 | A1 | 6/2023 |

OTHER PUBLICATIONS

Non-Final Office Action received for U.S. Appl. No. 18/434,737, mailed on Apr. 24, 2025, 12 pages.

Non-Final Office Action received for U.S. Appl. No. 18/434,732, mailed on Nov. 10, 2025, 18 pages.

Final Office Action received for U.S. Appl. No. 18/434,732, mailed on Mar. 25, 2026, 20 pages.

* cited by examiner

MULTI-SOURCE DISRUPTIVE BEHAVIOR EVALUATION AND MODERATION SYSTEM

CROSS-REFERENCE TO RELATED APPLICATIONS

This application is related by subject matter to concurrently filed U.S. patent application Ser. No. 18/434,732, and U.S. patent application Ser. No. 18/434,737, both of which are assigned to the same entity as the present application.

FIELD OF THE INVENTION

The present disclosure relates generally to the field of digital communication moderation. More specifically, it is concerned with the identification and management of disruptive behaviors, particularly disruptive speech, in online gaming environments.

BACKGROUND

Online gaming platforms have emerged as popular virtual spaces for global interactions, bringing together individuals from various backgrounds. A significant challenge within these environments is the maintenance of a respectful and healthy communication atmosphere, which is often disrupted by various forms of inappropriate speech and behavior.

Modern technologies employed in this realm can involve the use of artificial intelligence (AI) models, to detect patterns indicative of disruptive speech. However, the effectiveness of these models varies significantly. While some models are particularly adept at identifying overtly offensive language or hate speech, others may be better suited for detecting more subtle forms of harassment or non-compliant behavior.

A notable limitation of existing models is their diminished effectiveness across different linguistic and cultural contexts. These models, primarily trained on a specific language, struggle with accurately detecting disruptive speech in foreign languages. This poses a significant challenge in the inherently global and multilingual landscape of online gaming platforms. Additionally, the dynamic and constantly evolving nature of online speech, characterized by new slang terms, codewords, memetic references, and speech patterns, makes it difficult for AI models to keep up without continuous updates and retraining.

Furthermore, another critical issue with current models is their often limited capacity for deep contextual analysis. This leads to a tendency to generate false positives, where benign speech is wrongly identified as disruptive, or false negatives, where actual disruptive behavior goes undetected. These challenges highlight the need for an advanced solution that can effectively and adaptively identify a broad range of disruptive behaviors across various languages and cultural contexts, thereby addressing the limitations of current technologies.

Given these challenges, there is a clear need for an improved method and system that can more effectively and comprehensively identify and address a wide range of disruptive behaviors in online gaming environments. Such an improvement would enhance the overall gaming experience by creating a more respectful and welcoming community for all players.

BRIEF SUMMARY

The present disclosure introduces systems and methods for evaluating disruptive behaviors in voice chat audio within online environments, such as multiplayer gaming environments. This system uniquely integrates multiple evaluation systems, each employing distinct methodologies and algorithms to identify various types of disruptive behaviors. Such an approach recognizes the strengths and limitations of individual systems, allowing for a more nuanced and comprehensive detection of disruptive speech.

A key aspect of the invention is the aggregation and analysis of evaluation results from these diverse sources. This is crucial for determining which system is most effective in identifying specific categories of disruption, such as profanity, sexual harassment, bullying, hate speech, or other forms of negative interaction with other players. By leveraging the strengths of each system, the described embodiments facilitate a superior technique for detecting and scoring disruptive behaviors, a capability not found in prior solutions. Previous approaches in this domain have either relied on single evaluation sources or lacked automated evaluation of voice data. In contrast, this invention utilizes a multi-faceted approach, combining results from various sources to enhance accuracy. This method is particularly innovative in the relatively nascent field of addressing disruptive voice behavior.

The evaluation scoring service of the described embodiments necessitates specific inputs and configurations. Critical components for this process include evaluations of voice audio files with details of detected behaviors, such as behavior type, timestamps, duration, and confidence scores. In accordance with some embodiments described herein, the scoring process can be divided into different stages, taking into consideration the detected behavior types, confidence scores, and locations of the detected behaviors within the voice audio files. The scores can be utilized to determine severity levels of the disruptive behaviors, which can then be employed in subsequent processes to determine an appropriate penalty to issue or action to take for the detected disruptive behaviors.

Embodiments described herein significantly advance the field of disruptive behavior detection and management in online environments. Unlike prior solutions that rely on single evaluation sources or non-automated methods, this system's integrated approach from multiple evaluation sources offers a more precise and effective way to identify and address disruptive voice behaviors. The described embodiments are particularly suited for large-scale online gaming platforms where efficient and accurate moderation is essential for maintaining a positive gaming environment.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

Embodiments of the present disclosure are described in detail below with reference to the attached drawing figures, wherein.

DETAILED DESCRIPTION

Figure 1:
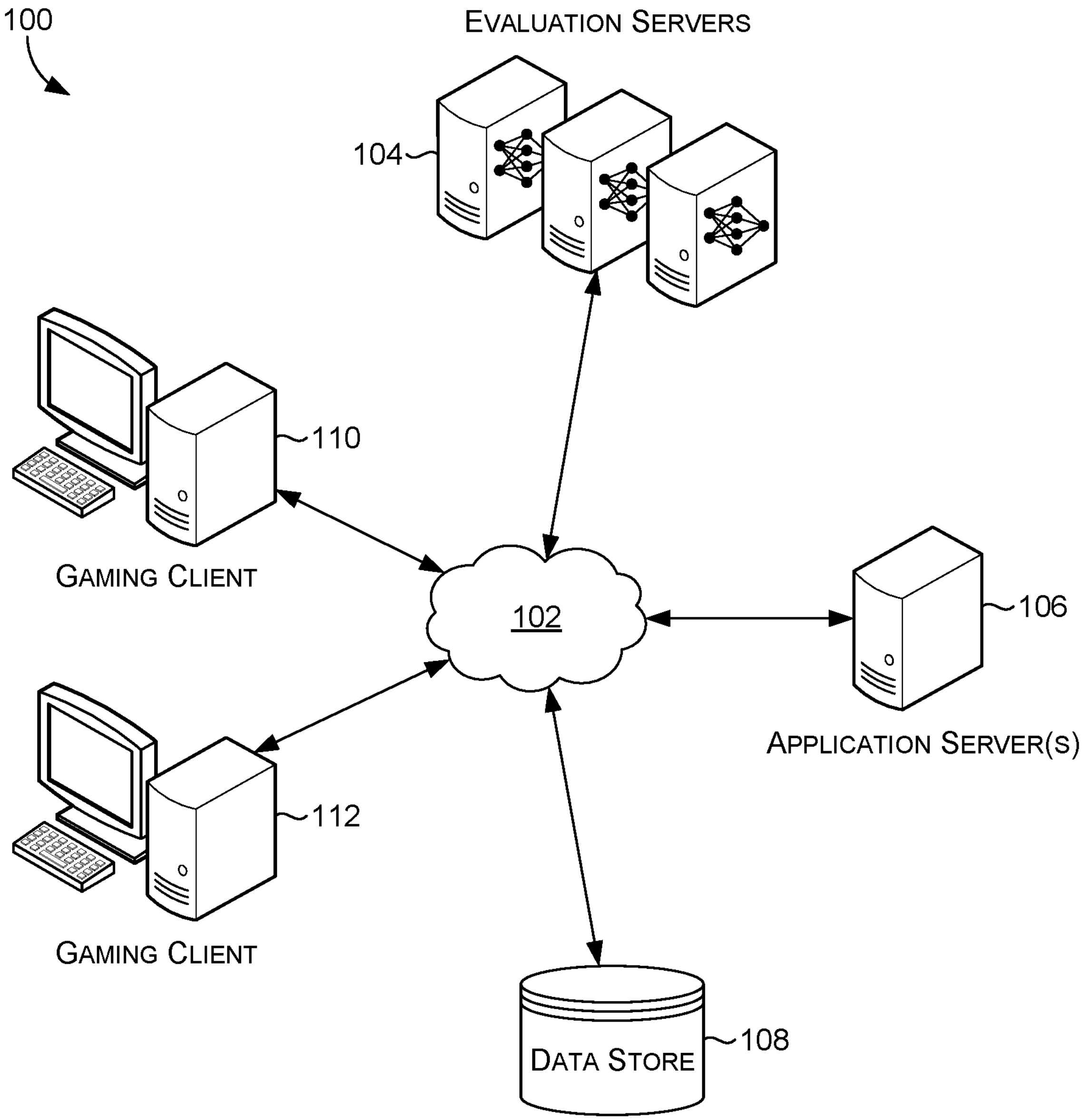
FIG. 1 depicts an exemplary operating environment in accordance with some embodiments of the present disclosure.

The subject matter of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments described herein describe an innovative system designed for evaluating and managing disruptive behaviors, particularly in the context of voice chat audio within online environments, such as multiplayer gaming. Embodiments describe a sophisticated evaluation system that integrates inputs from a variety of sources, whether from third-party service providers or internal systems. Each of these sources employs distinct methodologies and algorithms, specifically tailored to detect diverse types of disruptive behaviors in voice communications. This integration is pivotal, as it combines the strengths of various evaluation models to enhance the accuracy and nuance in detecting disruptive speech, a significant advancement over traditional single-source evaluation methods.

The variety of evaluation sources involved in this system is an instrumental component to its effectiveness. Each source can be specialized, some possibly being more adept at identifying profanity in certain languages, while others may be better at detecting behaviors, like sexual harassment by way of non-limiting example. This diversity is essential to cover the broad spectrum of disruptive behaviors that occur in the culturally and linguistically diverse world of online-based applications, like gaming. The described system's approach to integrating and analyzing evaluation results from these sources is just one innovative aspect of the present disclosure. It meticulously assesses and compares the efficacy of each source for different types of disruptive behaviors, allowing for the identification of the most reliable source or combination of sources for each specific disruption category. This methodology not only facilitates a comprehensive understanding of disruptive behaviors but also enhances the accuracy of the disruptive behavior score, an innovative feature in online voice chat moderation.

Another integral part of the present disclosure is the scoring and classification process, which is designed to handle the complexities of disruptive behavior in online communications. The process includes the classification of behavior tags based on confidence levels, a feature that allows for the standardization of behavior detection across various sources. The system can place a higher emphasis on high-confidence tags, with an innovative process for merging overlapping tags to ensure scoring accuracy. Low-confidence tags, while considered, may be excluded from the final scoring, maintaining the system's reliability and accuracy.

The scoring phase involves, among other things, the aggregation of lengths of all high-confidence behavior tags, and comparing them against pre-configured thresholds. This phase culminates in the calculation of an overall score, which can be instrumental in determining the severity of the disruptive behavior. This scoring process is a significant step forward from existing methods in online gaming moderation, which typically rely on less sophisticated, single-source evaluations or lack automated evaluations of voice data. Embodiments described herein, with their multi-source, integrated approach, offer a more robust, culturally sensitive, and accurate solution for identifying and managing disruptive behaviors in voice chat, offering a significant advancement in the field.

Turning now to FIG. 1, a schematic depiction is provided illustrating an exemplary operating environment 100 in which some embodiments of the present disclosure may be employed. It should be understood that this and other arrangements described herein are set forth only as examples. Other arrangements and elements (e.g. machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The operating environment 100 in FIG. 1 includes one or more application server(s) 106 that can communicate with one or more client devices over a network 102, such as a LAN, WAN, the Internet, or any combination thereof, by way of non-limiting example. The application server(s) 106 can host, for example, an online application that facilitates multi-user voice chat. For instance, the online application can include a multiplayer online game that hosts a plurality of gaming devices, such as gaming clients 110, 112, over the network 102.

Any one of gaming clients 110, 112 can include an audio input device (e.g. a microphone) that captures voice signals of a user of the gaming client. Each one of gaming clients 110, 112 is preferably associated with a user account also associated with a user of the device (e.g. a gamer). As any one of gaming clients 110, 112 receives (e.g. via microphone) voice signals of the associated user, the gaming client can generate audio data corresponding to the voice signals, which can then be transmitted to the application server(s)

106 to facilitate a voice-based group chat between multiple gaming clients and the users thereof. As audio data of various gaming clients, such as gaming clients 110, 112, is exchanged via application server(s) 106 via the network 102, any one of gaming clients 110, 112 can responsively playback (e.g. via speakers) audible signals corresponding to the audio data received from the application server(s) 106.

As noted, the application server(s) 106 can facilitate the exchange of audio data, such as voice chat data, between gaming clients 110, 112. In some aspects, the application server(s) 106 can communicate a gaming client's audio data to a plurality of evaluation servers 104, via the network 102, to request an evaluation of the audio data for disruptive behavior. In various embodiments, the evaluation servers 104 can include local computing devices, remote or third-party computing devices, or any combination thereof, to perform evaluations of audio data to detect various types of disruptive behavior. In a preferred embodiment, the evaluation servers 104 each employ independently-trained AI technologies (also referred to herein as "behavior detection models") to analyze the audio data received from the application server(s) 106. In embodiments, any one of evaluation servers 104 can employ any variety of AI technologies to detect disruptive behavior from audio data, including but not limited to, speech recognition technology, natural language processing (NLP), emotion recognition, sound analysis and classification, machine learning algorithms for pattern recognition, deep learning and neural networks, or voice biometrics, among other things.

After receiving audio data of a gaming client from application server(s) 106, the evaluation servers 104 can analyze the audio data, in parallel, to generate corresponding evaluation datasets based on the gaming client's audio data. In some embodiments, an evaluation dataset can include behavior tags that each define, among other things, a behavior type, timing information, and a confidence score. More specifically, a behavior tag can identify a portion of the audio data having a detected disruptive behavior, by identifying a start time and duration (or end time) of the detected type of disruptive behavior. The confidence score, in accordance with various embodiments described herein, is a numerical value typically ranging from 0 to 1, which represents the likelihood or certainty with which an evaluation server or behavior detection model thereof predicts a specific outcome or classification. In the context of this invention, a confidence score is assigned to each detected behavior within voice chat audio to quantify the evaluation server's certainty that the identified behavior meets the criteria for being classified as disruptive. A higher confidence score indicates a greater degree of certainty in the accuracy of the behavior's classification, whereas a lower score suggests less certainty.

After the audio data is analyzed, the evaluation servers 104 can send their respective evaluation datasets back to the application server(s) 106 to further process the results and determine a severity level of disruptive behavior, as will be described. The application server(s) 106 can store the severity level of disruptive behavior in association with the user account responsible for the disruptive behavior to a memory, such as data store 108. In some further embodiments, the application server(s) 106 can initiate administrative action on the user account based at least in part on the severity level of the detected disruptive behavior. By way of non-limiting example, administrative action may include penalties, or temporary suspensions to permanent account bans, depending on severity and frequency of the offenses associated with a user account.

It should be understood that any number of the aforementioned devices, in addition to the devices later mentioned herein, may be employed in operating environment 100 within the scope of the present disclosure. Each may comprise a single device or multiple devices cooperating in a distributed environment. Additionally, other components not shown may also be included within the distributed environment. It should further be understood that operating environment 100 shown in FIG. 1 is an example of one suitable computing system architecture. Each of the servers, client devices, networks, and data stores shown in the figures may be implemented via a computing device, such as computing device 800, later described with reference for FIG. 8, for example. The components may communicate with each other via network 102.

Figure 2:
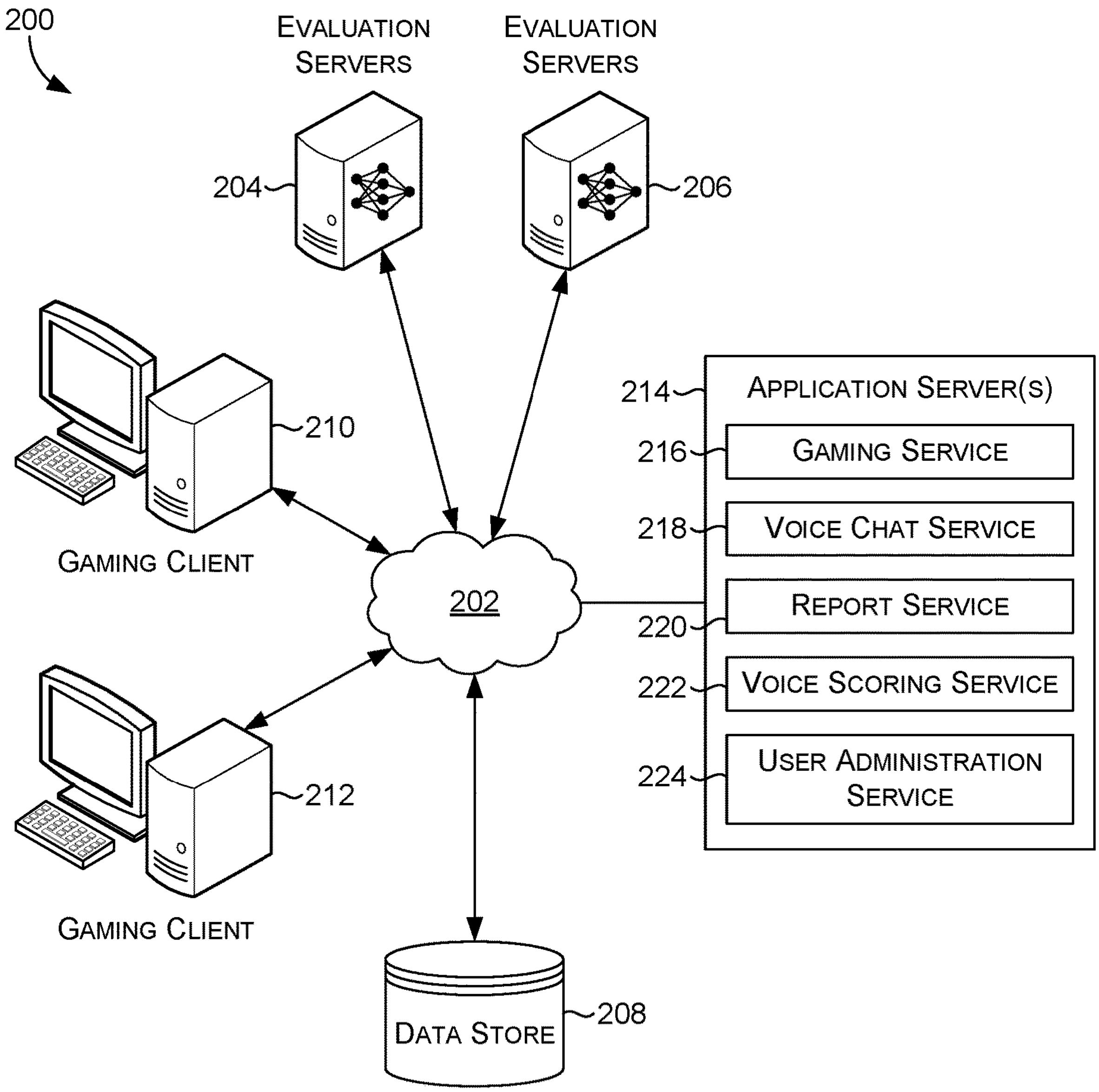
FIG. 2 is a block diagram depicting an exemplary implementation of a system for detecting and managing disruptive behavior in voice chats for online environments, in accordance with some embodiments of the present disclosure.

Referring now to FIG. 2, a block diagram is provided, illustrating an exemplary system 200 for detecting and managing disruptive behavior in voice chats for online environments. The block diagram of FIG. 2 depicts a network 202, gaming clients 210, 212, evaluation servers 204, 206, one or more application server(s) 214, and a data store 208, similar to those described in accordance with FIG. 1. Further illustrated is exemplary application server(s) 214 hosting a plurality of services that facilitate an online collaboration or gameplay environment with voice chat capabilities, as well as hosted services that facilitate the detection and management of disruptive behavior in voice chats, in accordance with some embodiments of the present disclosure.

The application server(s) 214 can host a variety of services, including a gaming service 216, a voice chat service 218, a report service 220, a voice scoring service 222, and a user administration service 224. In various embodiments, the application server(s) 214 can include any number of computing devices, whether hosted locally or remotely, embodied physically or virtually, or serviced by a gaming publisher or third-party provider.

The gaming service 216 can communicate with a plurality of client devices, such as gaming clients 210, 212, over network 202 such as a LAN, WAN, the Internet, or any combination thereof, by way of non-limiting example. The gaming service 216 can host, among other things, an online multiplayer game for a plurality of gaming clients 210, 212. While described herein in the context of multiplayer gaming, it is contemplated that the gaming service 216 can be any type of online application service where multiple client devices, such as gaming clients 210, 212, can virtually congregate and communicate with one another. Moreover, the reference to "gaming clients" or "players" is used herein merely in the context of an example embodiment, and such terms can also be respectively referred to more generically as "client devices" or "users" while remaining within the purview of the present disclosure.

One of the features of gaming service 216 is its ability to facilitate voice communications or "voice chat" between players of gaming clients 210, 212. In accordance with some embodiments, a voice chat service 218 can be employed to facilitate the exchange of audio data between gaming clients 210, 212. In the context of multiplayer gaming, the voice chat service 218 can facilitate voice chat between gaming clients 210, 212 during gameplay of a match, which can be limited in duration, typically expiring when a player (or the player's team) defeats all other players (or the opposing team) in the match, or when a predefined period of match play has expired. As audio data for a match is received from each gaming client (e.g. gaming client 210) and communicated to other gaming clients (e.g. gaming client 212), it is contemplated that audio data received by the voice chat service 218 from any particular gaming client is associated with that particular gaming client and is further associated with the user account of the particular gaming client. In this regard, as audio data for each player (and gaming client) is received by the voice chat service 218 for a single match, the voice chat service 218 can store the audio data for the player (and gaming client) into a memory, such as data store 208.

While it is contemplated that the audio data for all players can be evaluated for disruptive behavior following a match, or even during a match, the amount of resources required to store and evaluate such a vast amount of audio data can prove to be costly from a computing resource standpoint. To this end, a report service 220 can be provided to enable a player of a gaming client (e.g. gaming client 210) to file a complaint against (or otherwise report) another player of another gaming client (e.g. gaming client 212) during the match or following the conclusion of a match, for disruptive behavior exhibited during the match.

By way of non-limiting example, a first player associated with a first gaming client 210 and a second player associated with second gaming client 212 conclude a match of a multiplayer online game, hosted by gaming service 216. The first player is disappointed that the second player exhibited an excessive amount of inappropriate language during the match, and would like to file a complaint against the second player. The gaming service 216 and/or report service 220 can provide the first player with the ability to file a report against the second player (e.g. via a post-match GUI), indicating what the first player believes the second player should be evaluated for. As there may be a variety of reportable behaviors that report service 220 can receive as options for post-match reporting, it is contemplated that at least the reporting of "disrespectful behavior" through voice chat is an option made available to the reporting player. In this regard, the first player can report the second player for disrespectful behavior, and the report service 220 can responsively generate a new case (associated with the second player) to evaluate based on the report.

After generating a new case for disrespectful behavior, the report service 220 can retrieve the audio data of the second player (e.g. from data store 208), received from second gaming client 212, and communicate the audio data to evaluation servers 204, 206. As described in accordance with FIG. 1, the evaluation servers 204, 206 can each analyze the audio data in parallel to respectively generate an evaluation dataset as output for communication back to the report service 220. In accordance with some embodiments, an evaluation dataset can include, among other things, a behavior tag for one or more portions of the audio data. Each behavior tag can include a type of behavior identified by the respective evaluation server, timing information (e.g. timestamps, duration) associated with the identified type of behavior, and a confidence score associated with the identified type of behavior.

The report service 220 can then provide voice scoring service 222 with the various evaluation datasets received from the evaluation servers 204, 206. Voice scoring service 222 can review the evaluation datasets, specifically the behavior tag(s) therein, to determine whether or not a transgression, such as a disruptive behavior, should be flagged for the second user account associated with the audio data. As referenced herein, a transgression can include a confirmed incidence of disruptive behavior or other policy violation by a player. In some embodiments, the voice scoring service 222 will clean the evaluation datasets received from the evaluation servers 204, 206, such that behavior tags with zero confidence levels are removed. The voice scoring service 222 can then employ business logic, as will be described herein, to combine the various evaluation datasets into a consolidated evaluation dataset for scoring. In some further embodiments, the consolidated evaluation dataset with a new set of behavior tags is processed to determine a total duration of high confidence behavior tags therein. The total duration of high confidence behavior tags can then be compared to a variety of pre-defined thresholds to determine whether a transgression should be flagged for the user account.

In some embodiments, if no transgression is flagged for the user account, the evaluation process may conclude and no penalty may be issued. However, in some other embodiments, if sufficient evidence of disruptive behavior is found, a transgression may be issued to the user account, and the types and amounts of disruptive behavior may be subsequently considered to determine the severity of the transgression. The voice scoring service 222 can then store the types and amounts of disruptive behavior, along with the severity of the transgression, to a memory (e.g. data store 208) in association with the user account.

In some embodiments, a user administration service 224 can analyze the types and amounts of disruptive behavior, the severity of the transgression, along with behavioral history (e.g. previous types and amounts of disruptive behavior, transgressions) associated with the user account, to issue one or more penalties to the user account. Penalties may include, by way of example, a temporary ban or a permanent account suspension, depending on severity and frequency of the offenses associated with a user account.

Figure 3:
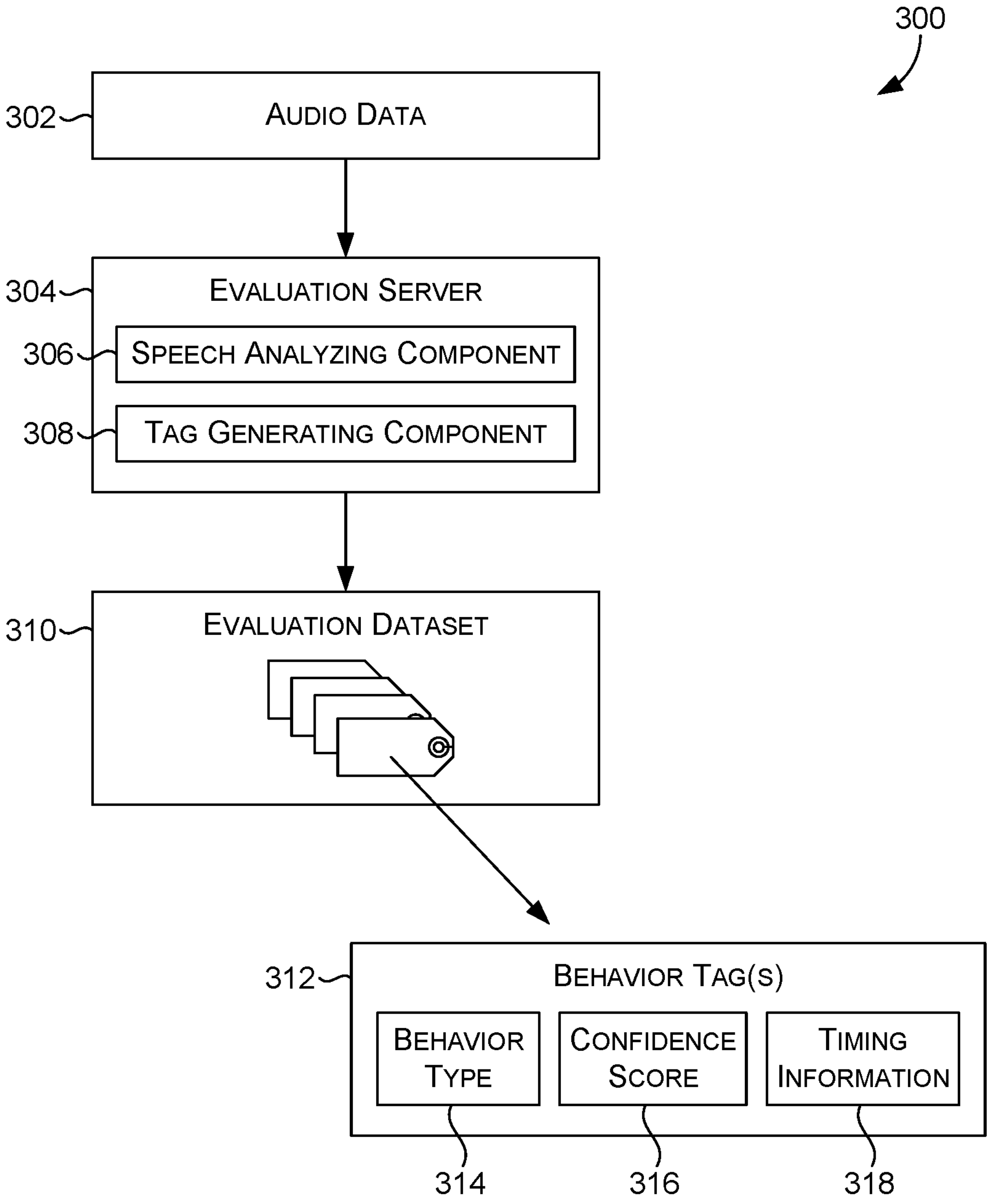
FIG. 3 is a flow diagram depicting an exemplary process of generating evaluation datasets based on audio data in accordance with some embodiments of the present disclosure.

Looking now to FIG. 3, a flow diagram is provided, depicting an exemplary evaluation process 300 performed by an evaluation server (e.g. evaluation servers 104 of FIG. 1, 204, 206 of FIG. 2), for generating evaluation datasets based on audio data in accordance with some embodiments of the present disclosure. The evaluation server 304 can receive audio data 302 associated with a user account (i.e., a player) after the conclusion of a match, either automatically after the conclusion of a match, or triggered in response to the generation of a new case (e.g. by report service 220 of FIG. 2). In various embodiments, the evaluation server 304 can include a speech analyzing component 306 and a tag generating component 308 that work together to generate an evaluation dataset 310 associated with the audio data 302. In various embodiments, any one of evaluation servers 104 can employ any variety of AI technologies or behavior detection models to implement the speech analyzing component 306 and tag generating component 308, which detect disruptive behavior from the audio data 302. The AI technologies may include, but are not limited to, speech recognition technology, natural language processing (NLP), emotion recognition, sound analysis and classification, machine learning algorithms for pattern recognition, deep learning and neural networks, or voice biometrics, among other things. The speech analyzing component 306 is generally responsible for analyzing the audio data and identifying portions therein that may include disruptive behaviors, such as profanity, sexual harassment, bullying, hate speech, or other forms of negative interaction with other players, by way of non-limiting example. The tag generating component 308, in conjunction with the speech analyzing component 306, can generate one or more behavior tags that correspond to each portion of the audio data identified by speech analyzing component 306 as having a disruptive behavior. As described herein, the evaluation dataset 310, generated as output by evaluation server 304, includes one or more behavior tag(s) 312 that define an identified behavior type 314, a confidence score calculated for the identified behavior type 314, and timing information 318 (e.g. a starting timestamp, an ending timestamp, and/or duration) associated with the identified behavior type 314.

Figure 4A:
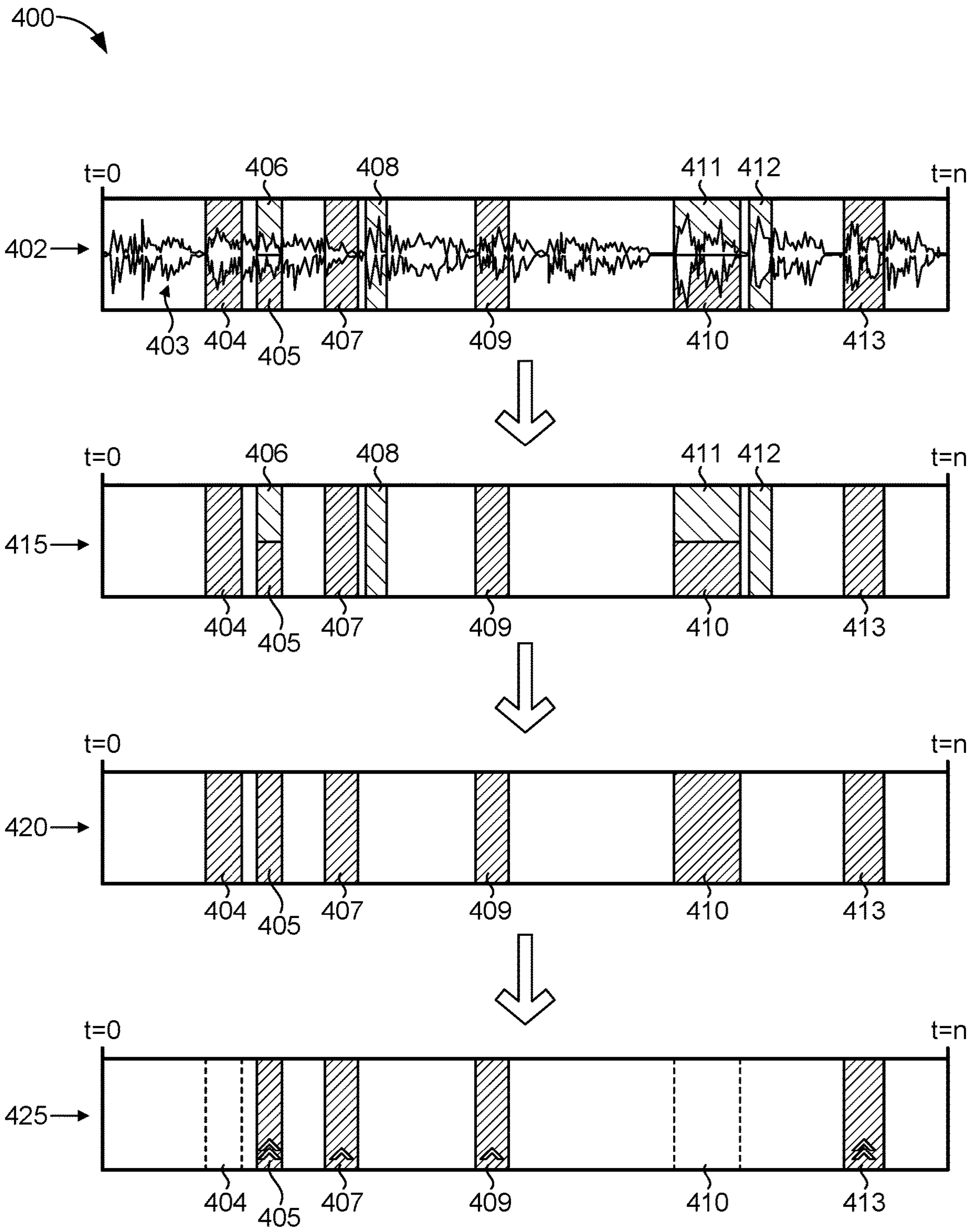
FIGS. 4A-4B are flow diagrams depicting exemplary process flows for cleaning evaluation datasets in accordance with some embodiments of the present disclosure.
Figure 4B:
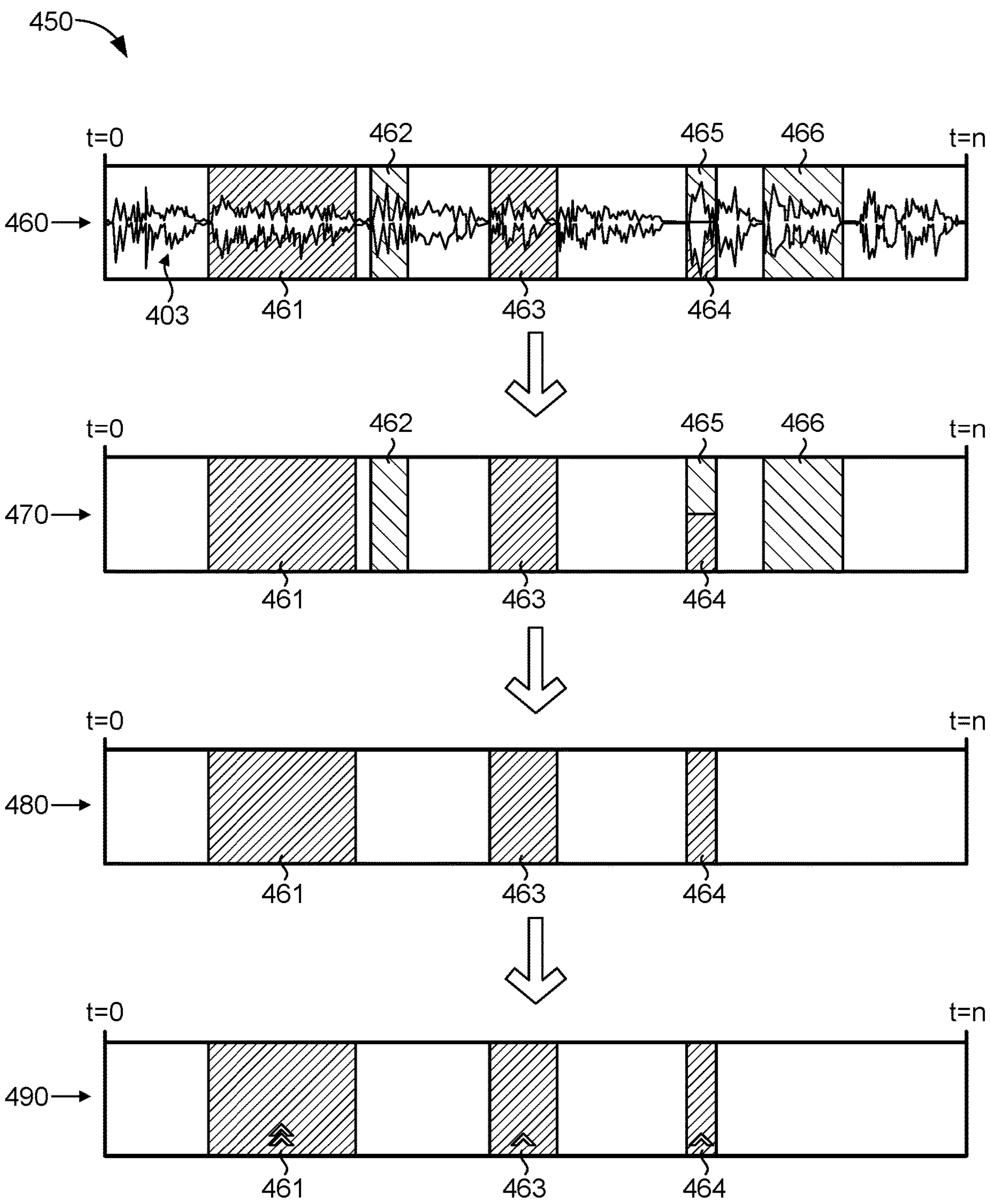

With reference now to FIGS. 4A-4B, flow diagrams are provided depicting exemplary process flows for cleaning evaluation datasets in accordance with some embodiments of the present disclosure. Specifically, FIG. 4A depicts a first process flow 400 for cleaning a first evaluation dataset from a first evaluation server, such as evaluation server 204 of FIG. 2, while FIG. 4B depicts a second process flow 450 for cleaning a second evaluation dataset from a second evaluation server, such as evaluation server 206 of FIG. 2. In various embodiments, the cleaning of evaluation datasets can be performed by a voice scoring service, such as voice scoring service 222 of FIG. 2. The provided process flows are merely provided as examples, and is no way intended to be limiting. The number of evaluation datasets may indeed vary in accordance with certain embodiments, as the number of evaluation servers involved in the evaluation of audio data is not necessarily limited.

Looking to FIG. 4A, the first process flow 400 depicts a visual representation for cleaning a first evaluation dataset 402 received from a first evaluation server, such as evaluation server 204 of FIG. 2. The first evaluation dataset 402 is depicted here as including the audio data 403 (starting at time=0 and ending at time=n) for purposes of illustration, though it is contemplated that the audio data 403 itself does not necessarily need to be included in the first evaluation dataset 402 generated by the first evaluation server. Also included in the first evaluation dataset 402 are behavior tags of a first detected behavior type 404, 405, 407, 409, 410, 413, in addition to behavior tags of a second detected behavior type 406, 408, 411, 412. As discussed herein, a behavior type can include any type of disruptive behavior for which the evaluation server is configured to detect, including but not limited to profanity, sexual harassment, verbal abuse, hate speech, or other forms of negative interaction with other players. As is evidenced in this particular example, some of the behavior tags of different types may overlap similar windows of time, such as behavior tags 405, 406, or behavior tags 410, 411.

For purposes of simplification, evaluation dataset 402 is depicted again as evaluation dataset 415, without the audio data 403, but including the behavior tags of the first detected behavior type 404, 405, 407, 409, 410, 413, as well as the behavior tags of the second detected behavior type 406, 408, 411, 412. To further simplify the explanation of the first process flow 400, this discussion will be limited to the cleaning of the behavior tags of the first detected behavior type 404, 405, 407, 409, 410, 413, as depicted in evaluation dataset 420, though it is contemplated that behavior tags of the second detected behavior type 406, 408, 411, 412 will also be cleaned, as would any other types of detected behavior tags not considered in the illustrated example.

In accordance with various embodiments, each of the behavior tags of the first detected behavior type 404, 405, 407, 409, 410, 413 are defined with a detected behavior type, a confidence score, and timing information, as described in accordance with FIG. 3. The confidence levels are defined by the first evaluation server utilizing a standardized scale (e.g. 0 to 1), indicating a level of confidence that the first evaluation server identifies the corresponding portion of audio data as exhibiting a disruptive behavior of the first detected behavior type. In some embodiments, with reference to evaluation dataset 425, the cleaning process can remove behavior tags having zero levels of confidence. Though not shown, it is also contemplated that the cleaning process can also remove behavior tags having low levels of confidence in accordance with some other embodiments. In the illustrated example, however, only the zero confidence behavior tags of the first detected behavior type 404, 410 are removed from the evaluation dataset 425, as indicated by the sections of the evaluation dataset 425 bounded by dotted lines.

As also illustrated, some of the behavior tags of the first detected behavior type 405, 413 are flagged as having a high confidence level, as indicated by the double caret symbols, while other behavior tags of the first detected behavior type 407, 409 are flagged as having a low confidence level, as indicated by the single caret symbols. In some embodiments, the confidence thresholds for determining whether a behavior tag has a zero, low, or high confidence level, can be programmatically defined by an administrator (e.g. of the voice scoring service). In some embodiments, the confidence thresholds may be defined specific to each evaluation server, and even behavior type, though it is also contemplated that the confidence thresholds can remain standardized for all evaluation servers utilized and/or behavior types evaluated by the described system.

Looking now at FIG. 4B, the second process flow 450 depicts a visual representation for cleaning a second evaluation dataset 460 received from a second evaluation server, such as evaluation server 206 of FIG. 2. The second evaluation dataset 460 is depicted here including the same audio data 403 (starting at time=0 and ending at time=n) as FIG. 4A, though it is again contemplated that the audio data 403 itself does not necessarily need to be included in the second evaluation dataset 460 generated by the second evaluation server. Also included in the second evaluation dataset 460 are behavior tags of the first detected behavior type 461, 463, 464, in addition to behavior tags of the second detected behavior type 462, 465, 466. As is evidenced in this particular example, some of the behavior tags of different types may overlap similar windows of time, such as behavior tags 464, 465.

For purposes of simplification, evaluation dataset 460 is depicted again as evaluation dataset 470, without the audio data 403, but also including the behavior tags of the first detected behavior type 461, 463, 464, as well as the behavior tags of the second detected behavior type 462, 465, 466. To further simplify the explanation of the second process flow 450, this discussion will be limited to the cleaning of the behavior tags of the first detected behavior type 461, 463, 464, as depicted in evaluation dataset 480, though it is again contemplated that behavior tags of the second detected behavior type 462, 465, 466, will also be cleaned, as would any other types of detected behavior tags not considered in the illustrated example.

In accordance with various embodiments, each of the behavior tags of the first detected behavior type 461, 463, 464, are defined with a detected behavior type, a confidence score, and timing information, as described in accordance with FIG. 3. The confidence levels are defined by the second evaluation server utilizing a standardized scale (e.g. 0 to 1), indicating a level of confidence that the second evaluation server identifies the corresponding portion of audio data as exhibiting a disruptive behavior of the first detected behavior type. In various embodiments, with reference to evaluation dataset 490, the cleaning process can remove behavior tags having zero levels of confidence. In the illustrated example, each of the behavior tags of the first detected behavior type 461, 463, 464, have defined confidence levels higher than zero.

As also illustrated, one of the behavior tags of the first detected behavior type 461 are flagged as having a high confidence level, as indicated by the double caret symbols, while other behavior tags of the second detected behavior type 463, 464 are flagged as having a low confidence level, as indicated by the single caret symbols. In some embodiments, the confidence thresholds for determining whether a behavior tag has a zero, low, or high confidence level, can be programmatically defined by the administrator of the voice scoring service. In some embodiments, the confidence thresholds may be defined specific to each evaluation server, though it is also contemplated that the confidence thresholds can remain standardized for all evaluation servers utilized by the described system.

Figure 5:
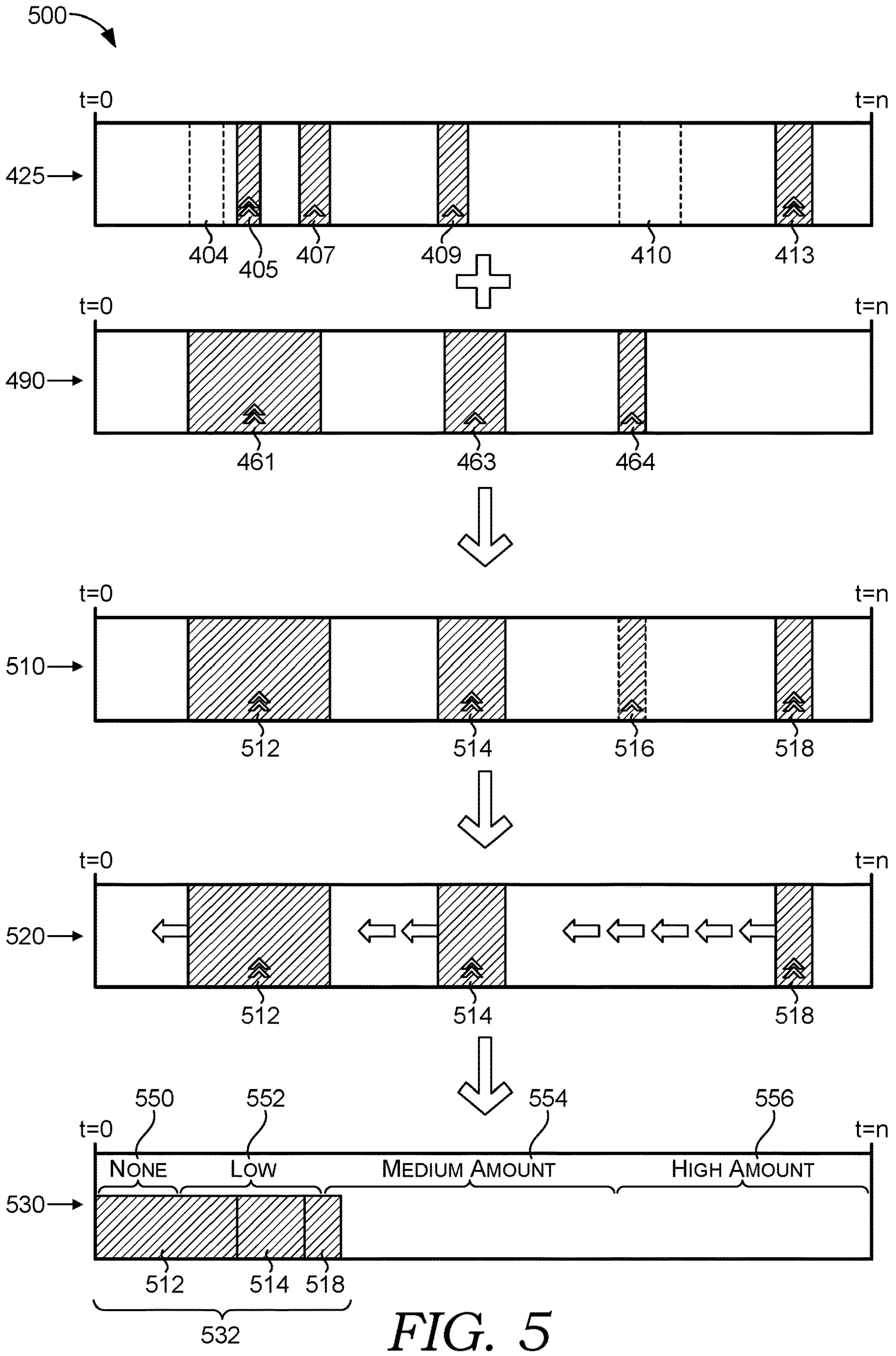
FIG. 5 is a flow diagram depicting the combination and collection of high and low confidence behavior tags into a consolidated evaluation dataset for scoring, in accordance with some embodiments of the present disclosure.

With reference now to FIG. 5, a flow diagram is provided illustrating a process flow 500 that depicts the combination of high and low confidence behavior tags from multiple evaluation servers into a consolidated evaluation dataset. The process flow 500 relates to the feature of generating a consolidated evaluation dataset, for scoring audio data in accordance with some embodiments of the present disclosure. The process flow 500 depicted in FIG. 5 follows the first and second process flows 400, 450 of FIGS. 4A-4B, and illustrates the generation and scoring of a consolidated evaluation dataset utilizing the cleaned evaluation datasets of FIGS. 4A-4B. In accordance with some embodiments described herein, the consolidated evaluation dataset generation and scoring processes demonstrated with reference to FIG. 5 may be performed by a voice scoring service, such as voice scoring service 222 of FIG. 2.

As was described in accordance with FIGS. 4A-4B, a first evaluation dataset 425 can be cleaned by the voice scoring service after it is received from a first evaluation server (e.g. first evaluation server 204 of FIG. 2). Similarly, a second evaluation dataset 490 can be cleaned by the voice scoring service after it is received from a second evaluation server (e.g. second evaluation server 206 of FIG. 2). After the voice scoring service cleans the first and second evaluation datasets 425, 490, the voice scoring service combines each of the cleaned evaluation datasets (e.g. first and second evaluation datasets 425, 490) into a consolidated evaluation dataset 510. In various embodiments, the voice scoring service employs business logic to combine behavior tags from cleaned evaluation datasets to generate the consolidated evaluation dataset 510.

In some embodiments, the business logic can define whether behavior tags from different evaluation servers, having the same behavior type and overlapping in time, should be combined to generate a new behavior tag for the consolidated evaluation dataset 510. To facilitate the business logic, a piece of metadata can be stored with each behavior tag from the evaluation servers, to indicate whether low confidence behavior tags can be combined with behavior tags from other evaluation servers to increase confidence levels. By way of example, if the piece of metadata is "true" for overlapping behavior tags from different evaluation servers: two low confidence behavior tags can be merged to become a high confidence behavior tag; two high confidence behavior tags can be merged and remain a high confidence behavior tag; and one low confidence behavior tag and one high confidence behavior tag can be merged to become a high confidence behavior tag. If, however, the piece of metadata is "false" for any behavior tag overlapping with another behavior tag from a different evaluation server: two low confidence behavior tags can be merged and will remain low confidence; two high confidence behavior tags can be merged and will remain high confidence; and one low confidence behavior tag and one high confidence behavior tag can be merged to become a high confidence behavior tag. In some other embodiments, particularly in implementations where the voice scoring service cleans the evaluation datasets to remove all zero and low confidence behavior tags, the business logic can simply determine whether high confidence behavior tags from different evaluations servers overlap, and can merge them to become a new high confidence behavior tag for the consolidated evaluation dataset 510.

Using the illustrated example, we assume that the behavior tags from the first and second evaluation servers have a piece of metadata of "true." Here, the voice scoring service combines behavior tags overlapping in time, and having both low and high confidence scores. By way of example, high and low confidence behavior tags 405, 407 of the first detected behavior type from the first evaluation dataset 425 overlap in time with a high confidence behavior tag 461 of the first detected behavior type from the second evaluation dataset 490. In this regard, the voice scoring service will combine the overlapping tags 405, 407, 461 because they overlap in time. The voice scoring service will define the new, consolidated behavior tag 512 as having a high confidence level, and will also define the time information of the consolidated behavior tag 512 to span across all of the overlapping tags 405, 407, 425. Here, consolidated behavior tag 512 has the same starting timestamp as high confidence behavior tag 461 of the first detected behavior type from the second evaluation dataset 490, and will conclude at the same time (or have the same ending timestamp) as the ending time of low confidence behavior tag 407 of the first detected behavior type from the first evaluation dataset 425. As noted herein, the time information can be defined with start and end timestamps, or a start timestamp and a duration, either corresponding to the portion of the audio data tagged by the consolidated behavior tag.

The voice scoring service next combines behavior tags overlapping in time, and having only low confidence scores. By way of example, low confidence behavior tag 409 of the first detected behavior type from the first evaluation dataset 425 overlaps in time with another low confidence behavior tag 463 of the first detected behavior type from the second evaluation dataset 490. In this regard, the voice scoring service will combine the overlapping tags 409, 463 because they overlap in time. The voice scoring service will define the new, consolidated behavior tag 514 as having a high confidence level, and will also define the time information of the consolidated behavior tag 514 to span across all of the overlapping tags 409, 463. Here, consolidated behavior tag 514 has the same starting timestamp as low confidence behavior tag 409 of the first detected behavior type from the first evaluation dataset 425, and will conclude at the same time as the ending time of low confidence behavior tag 463 of the first detected behavior type from the second evaluation dataset 490.

In some embodiments, the voice scoring service can maintain non-overlapping low confidence behavior tags, such as behavior tag 464, within the consolidated evaluation dataset 510. A behavior tag may be considered non-overlapping if it does not overlap in time with another behavior tag of the same behavior type from another evaluation dataset. In a preferred embodiment, the non-overlapping low confidence behavior tags won't be utilized for scoring the type of disruptive behavior (e.g. the first detected behavior type), but can be maintained within the consolidated evaluation dataset 510 for future reference. However, it is contemplated that such non-overlapping low confidence behavior tags can also be utilized for scoring the type of disruptive behavior.

In some embodiments, the voice scoring service can maintain non-overlapping high confidence behavior tags, such as behavior tag 518, within the consolidated evaluation dataset 510. As described above, a behavior tag may be considered non-overlapping if it does not overlap in time with another behavior tag of the same behavior type from another evaluation dataset. In a preferred embodiment, the non-overlapping high confidence behavior tags can be utilized for scoring the type of disruptive behavior (e.g. the first detected behavior type), though it is possible that they are also not utilized for scoring, but merely maintained for future reference.

The voice scoring service, having generated a consolidated evaluation dataset 510, can now determine a score for the behavior type consolidated in consolidated evaluation dataset 510. In the illustrated example, behavior tags of only the first detected behavior type are depicted for sake of brevity, and it is contemplated that the consolidated evaluation dataset 510 may also include consolidated behavior tags of other detected behavior types. Following this example, the voice scoring service can calculate a summed duration of high confidence behavior tags of the first detected behavior type. The consolidated evaluation dataset 510 is depicted again as consolidated evaluation dataset 520, with arrows pointing leftwards to demonstrate how each high confidence behavior tag 512, 514, 518 is shifted towards t=0, to calculate a summed duration of behavior tags of the first detected behavior type.

By way of non-limiting example, assume that high confidence behavior tag 512 has a duration of 4 seconds, high confidence behavior tag 514 has a duration of 2 seconds, and high confidence behavior tag 518 has a duration of 1 second. The summed duration of high confidence behavior tags 512, 514, 518 is depicted as total duration 532, the high confidence behavior tags 512, 514, 518 of the first detected behavior type having a total duration 532 of 7 seconds. The voice scoring service can then compare the total duration 532 to a series of predefined threshold behavior amounts 550, 552, 554, 556, each defining a range of time to which the total duration 532 can be compared. In this example, the predefined threshold behavior amounts are defined as having behavior levels of none 550 (e.g. t=0 sec to t=2.3 sec), low 552 (e.g. t=2.3 sec to t=6.5 sec), medium 554 (e.g. t=6.5 sec to t=15 sec), or high 556 (e.g. t=15 sec to t=n sec). The voice scoring service can determine that the total duration 532 falls within the medium range (e.g. greater than the medium behavior amount threshold and less than the high behavior amount threshold), and thus determine that the disruptive behaviors of the first detected behavior type should be flagged with a medium behavior level.

In some embodiments, after the voice scoring service determines a behavior level for a detected behavior type, the voice scoring service can further assign a behavior level score to the detected behavior type depending on the determined behavior level (e.g. 0 points for none, 5 points for low, 10 points for medium, 15 points for high). Following this example, the voice scoring service may give the medium behavior level for the detected behavior type a 10 point behavior level score. As the foregoing is merely provided as an example, it is contemplated that the voice scoring service may assign each behavior level (e.g. none, low, medium, high) with varying scores depending on implementation.

For instance, the voice scoring service may have a different set of predefined scores for the various behavior levels, depending on the behavior type. Departing from the previous example and by way of a new example is a table of behavior level scores that may be assigned to various behavior levels in audio data based on behavior type.

| Behavior Levels to Behavior Level Scores | | | |
|---|---|---|---|
| Behavior Type | Low Behavior Level | Medium Behavior Level | High Behavior Level |
| Behavior A | 10 | 20 | 30 |
| Behavior B | 5 | 12 | 20 |
| Behavior C | 30 | 50 | 75 |
| Behavior D | 15 | 30 | 45 |

Also provided below is a table of detected behavior types within the audio data, along with a total duration of each detected behavior type in the audio data, and a behavior level determined for each detected behavior type based on the total duration determined for the detected behavior type. In this example, only behavior types A, C, and D were detected in the audio data, while behavior types A and D were the only behavior types having a behavior level of high, medium, or low.

| Behavior Type | Total Behavior Duration | Behavior Level | Behavior Level Score |
|---|---|---|---|
| Behavior A | 21.2 | Medium | 10 |
| Behavior C | 18.3 | None | 0 |
| Behavior D | 32.3 | Medium | 20 |

Here, behavior types A and D are assigned medium behavior levels because their total behavior durations exceed the thresholds for medium behavior level for their respective behavior types, but are less than the thresholds for high behavior level for their respective behavior types. Behavior type C, on the other hand, is assigned a behavior level of none, because the threshold for a low behavior level of behavior type C requires at least a 30 second total behavior duration.

In some embodiments, after the voice scoring service determines a behavior level score for each behavior type detected in the audio data, the voice scoring service can calculate a sum of all behavior level scores across all behavior types to determine a total severity score for the audio data. The voice scoring service can then compare the total severity score to a predefined set of severity thresholds to determine an overall severity level, otherwise referred to herein as "transgression severity level," that corresponds to all of the disruptive behavior(s) detected in the audio data. Continuing on with this example, the voice scoring service can determine that the total severity score calculated from all behavior level scores equals 30 points. That is, the behavior level score of 10 for behavior type A plus the behavior level score of 20 for behavior type D equals a total severity score of 30 points. The voice scoring service can then compare the total severity score of 30 to the below predefined set of severity thresholds to determine the transgression severity level.

| Total Severity Score to Transgression Severity Level | |
|---|---|
| Severity Threshold | Severity Level |
| 10 | 3 |
| 20 | 2 |
| 30 | 1 |
| 50 | 0 |

Here, the total severity score of 30 points calculated for the audio data is greater than or equal to the severity thresholds of 10, 20, and 30, but is less than the severity threshold of 50. As such, the total severity score of 30 points corresponds to a transgression severity level of 1.

In some embodiments, the determined transgression severity level will be stored in a memory in association with the user account associated with the audio data. In some further embodiments, the transgression severity level may only be stored in association with the user account if the transgression severity level exceeds a defined threshold severity level. By way of non-limiting example, a threshold severity level of 2 could dictate an implementation where a determined transgression severity level of 2 or higher (e.g. 2, 1, or 0) is saved in association with the user account associated with the audio data. In various embodiments, if the determined transgression severity level is saved in association with the user account associated with the audio data, then the voice scoring service can inform the report service (e.g. report service 220 of FIG. 2) that a transgression severity level has been determined. In this regard, if an administrative action is programmatically defined to be executed for user accounts having met a particular transgression severity level, then a user administration service (e.g. user administration service 224 of FIG. 2) can responsively execute the administrative action. In some cases, the user administrative service can evaluate a variety of factors associated with the user account prior to executing the administrative action. Factors may include a history of determined transgression severity levels, prior administrative actions or penalties given to the user account, or the like. It is contemplated that higher transgression severity levels may lead to more aggressive penalties, particularly if such high levels are determined to have occurred in a short period of time.

In some embodiments, an administrator can be automatically notified of transgression severity levels, or of a determination that certain threshold severity levels have been exceeded. To this end, the administrator could manually determine the administrative action to take on the user account. As discussed herein, administrative action may include any variety of administrative action, including penalties, or temporary suspensions to permanent account bans, among other things.

Figure 6:
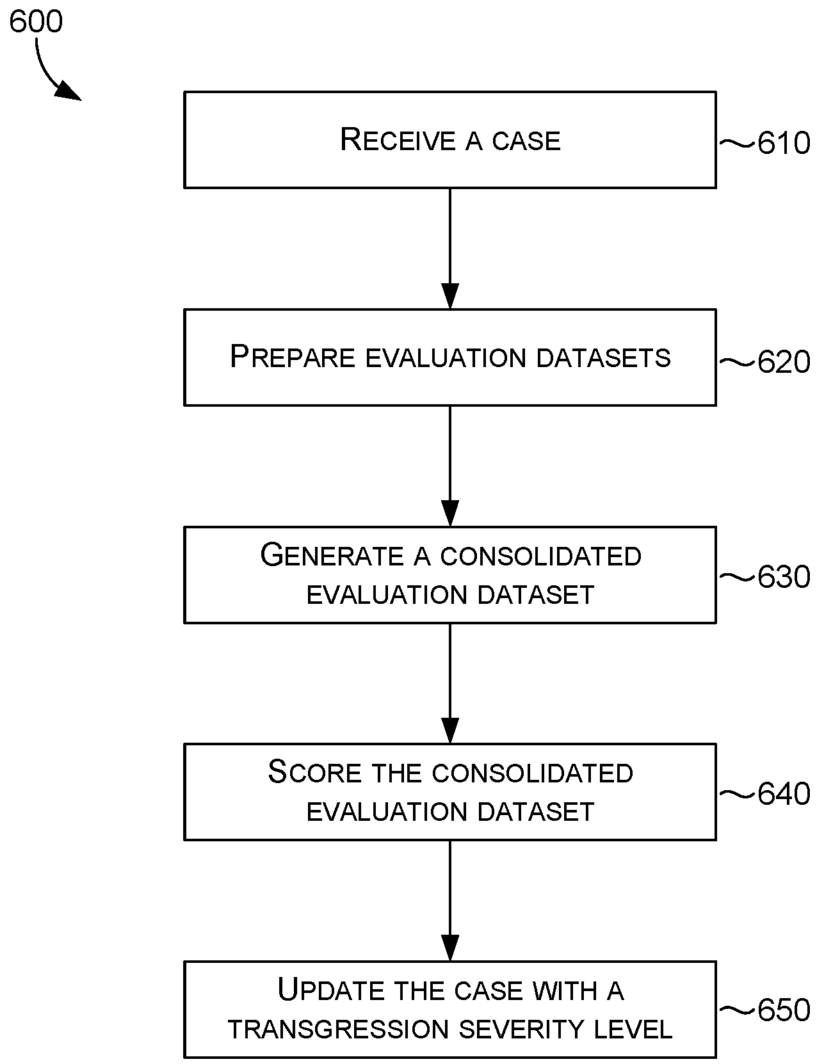
FIG. 6 is a flow diagram depicting a method for detecting and managing disruptive behavior in voice chats for online environments in accordance with some embodiments of the present disclosure.

Referring now to FIG. 6, a flow diagram is provided that illustrates a method 600 for detecting and managing disruptive behavior in voice chats for online environments in accordance with some embodiments of the present disclosure. As shown at block 610, a voice scoring service hosted by an application server, such as voice scoring service 222 of FIG. 2, can receive a case having a plurality of evaluation datasets. The case can be a data object, memory location, database record, or other storage medium, created by a report service, such as report service 220 of FIG. 2. In some embodiments, the case is generated after a report of disruptive behavior is received from a first client device (associated with a first user account) reporting disruptive behavior about a second client device (associated with a second user account). In some embodiments, the report is submitted following the conclusion of a match between at least the first and second client devices involved in an online multiplayer game. In some other embodiments, the report is submitted at any point in time during or after a voice exchange between at least the first and second client devices. The case may define the second client device or second user account as the subject of investigation, for potential disruptive behavior exhibited in voice chat (e.g. during a match or in a chat room). In various embodiments, the report service 220 generates the case by storing therein a plurality of evaluation datasets received from a plurality of evaluation servers (e.g. evaluation servers 104, 204, 206 of FIGS. 1-2) responsive to sending audio data associated with the second user account to the plurality of evaluation servers. Each of the evaluation datasets stored within the case can include one or more behavior tags associated with a portion of the audio data, with each behavior tag defining a detected behavior type, a confidence score determined for the detected behavior type, and timing information associated with the detected behavior type, as described in accordance with the embodiments of FIG. 3.

After the voice scoring service receives the case, at block 620, the voice scoring service is responsible for preparing the evaluation datasets for generating a consolidated evaluation dataset and determining a score for each detected behavior type in the audio data. In accordance with the embodiments of FIGS. 4A-4B, each evaluation dataset is first cleaned by the voice scoring service to remove any behavior tags having a zero confidence score. All other behavior tags having a low or high confidence score can remain stored in the individual evaluation datasets. After each evaluation dataset is cleaned, the voice scoring service at block 630 generates a consolidated evaluation dataset for the audio data. The voice scoring service can create the consolidated evaluation dataset by combining behavior tags from the plurality of evaluation datasets having low or high confidence scores. More specifically, the voice scoring service can combine behavior tags from the plurality of evaluation datasets based on the detected behavior types and corresponding confidence scores. As described in accordance with embodiments of FIG. 5, the voice scoring service can employ predefined business logic to combine the behavior tags from the cleaned evaluation datasets to generate the consolidated evaluation dataset.

In some embodiments, the business logic can define whether behavior tags from different evaluation servers, having the same behavior type and overlapping in time, should be combined to generate a new behavior tag of that behavior type for the consolidated evaluation dataset. To facilitate the business logic, a piece of metadata can be stored with each behavior tag of a particular behavior type from the evaluation servers, to indicate whether low confidence behavior tags, overlapping in time, can be combined with behavior tags of the particular behavior type from other evaluation servers to increase confidence levels. By way of non-limiting example, if the piece of metadata is “true” for overlapping behavior tags of a common behavior type from different evaluation servers: two low confidence behavior tags can be merged to become a high confidence behavior tag; two high confidence behavior tags can be merged and remain a high confidence behavior tag; and one low confidence behavior tag and one high confidence behavior tag can be merged to become a high confidence behavior tag. Alternatively, if the piece of metadata is “false” for any behavior tag of a particular behavior type overlapping with another behavior tag of the particular behavior type from a different evaluation server: two low confidence behavior tags can be merged and will remain low confidence; two high confidence behavior tags can be merged and will remain high confidence; and one low confidence behavior tag and one high confidence behavior tag can be merged to become a high confidence behavior tag. In some embodiments, only high confidence behavior tags may be considered to generate the consolidated evaluation dataset. In this case, a piece of metadata may not be necessary in the behavior tags to determine whether overlapping behavior tags of a common behavior type from different evaluation servers should be merged. By way of non-limiting example, when overlapping behavior tags of a common behavior type are received from different evaluation servers, barring any exceptions, the high confidence behavior tags can be merged and remain a high confidence behavior tag.

After the voice scoring service applies the business logic to the behavior tags and generates the consolidated evaluation dataset, the voice scoring service can determine a score for each behavior type in the consolidated evaluation dataset based on the high confidence behavior tags of that behavior type therein. More specifically, looking at the behavior types of the high confidence behavior tags in the consolidated evaluation dataset, the voice scoring service can determine a summed duration of high confidence behavior tags for each behavior type detected in the audio data. That is, the voice scoring service can add up the duration of each high confidence behavior tag for each behavior type to calculate a summed duration of the high confidence behavior tags for that behavior type. The voice scoring service can then, for each behavior type detected in the audio data, compare the summed duration for the behavior type to a series of predefined threshold behavior amounts defining a range of time to which the summed duration can be compared. In this way, the voice scoring service can determine which behavior level (e.g. none, low, medium, high) the detected disruptive behaviors of each behavior type should be associated with. Following the determination of behavior levels for the various behavior types, the voice scoring service can assign a behavior level score to each behavior type detected in the audio data depending on the behavior level it is associated with.

After the voice scoring service determines a behavior level score for each behavior type detected in the audio data, the voice scoring service can calculate a sum of all behavior level scores across all behavior types to determine a total severity score for the audio data. The voice scoring service can then compare the total severity score to a predefined set of severity thresholds to determine a transgression severity level that corresponds to all of the disruptive behavior(s) detected in the audio data.

In some embodiments, the determined transgression severity level can be stored in a memory in association with the second user account. In some further embodiments, the transgression severity level will only be stored in association with the second user account if the transgression severity level exceeds a defined threshold severity level. If the transgression severity level doesn't exceed the defined threshold severity level, the evaluation process may conclude and no penalty may be issued. If, however, the transgression severity level does exceed the defined threshold severity level, a transgression of the corresponding behavior type and having the determined transgression severity level may be flagged for the second user account. In some cases, the types and amounts of disruptive behavior may also be stored in association with the second user account. The voice scoring service can then update the case, in block 650, to store the transgression severity level, among other things. In some embodiments, a user administration service (e.g. user administration service 224 of FIG. 2) can analyze the transgression severity level, along with behavioral history (e.g. previous transgressions and/or transgression severity levels) associated with the second user account, to issue one or more penalties to the second user account. Penalties may include, by way of example, a temporary ban or a permanent account suspension, among other things, depending on severity and frequency of the offenses associated with the first user account.

Figure 7:
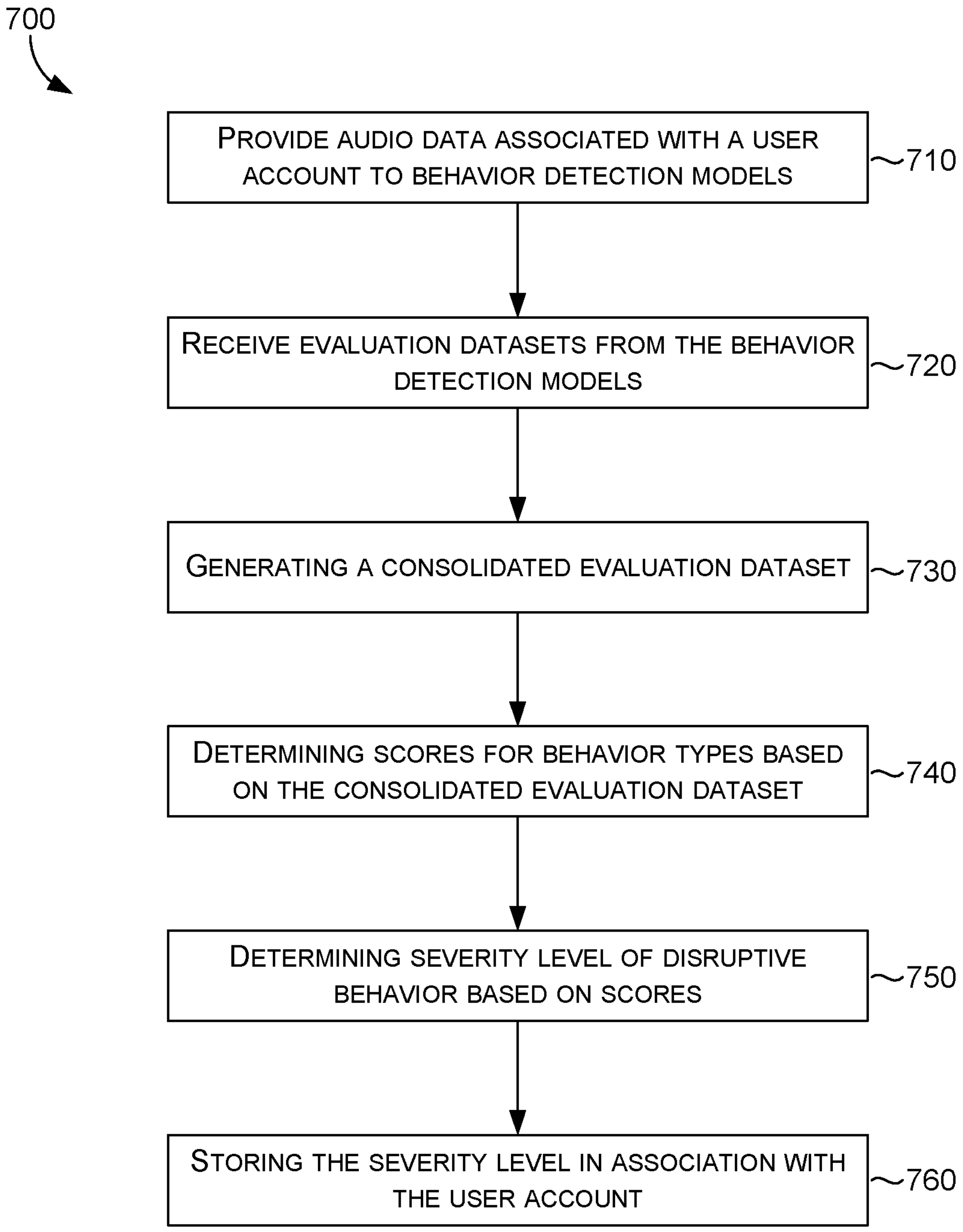
FIG. 7 is a flow diagram depicting another method for detecting and managing disruptive behavior in voice chats for online environments in accordance with some embodiments of the present disclosure.

Referring now to FIG. 7, a flow diagram is provided that illustrates a method 700 for detecting and managing disruptive behavior in voice chats for online environments in accordance with some embodiments of the present disclosure. It is contemplated that method 700 is performed by one or more application servers (e.g. application server(s) 106 of FIG. 1, 214 of FIG. 2) described in accordance with embodiments of the present disclosure. As shown at block 710, audio data associated with a user account is provided to a plurality of behavior detection models configured to detect occurrences of disruptive behavior. More specifically, audio data associated with a second user account can be captured during an online session, such as a session of a multiplayer online video game (e.g. gaming service 216 of FIG. 2) where a voice chat service (e.g. voice chat service 218 of FIG. 2) is provided to multiple users in the online session. If a first user account submits (e.g. via gaming service 216) a report that a second user of the second user account was exhibiting disruptive behavior during the online session (e.g. during a video game match), the audio data associated with the second user account can be communicated (e.g. via report service 220 of FIG. 2) to a plurality of evaluation servers over a network (e.g. network 202 of FIG. 2). As described herein, it is preferable that each of the evaluation servers employ distinct methodologies and algorithms, or AI-based behavior detection models, to identify one or more types of disruptive behaviors. Each of the evaluation servers can then evaluate the audio data associated with the second user account to generate a corresponding evaluation dataset in accordance with FIG. 3. More specifically, the evaluation dataset generated by any one of the evaluation servers can include a set of behavior tags that each defines one of a plurality of behavior types detected by the evaluation server, a confidence score associated with the detected behavior type, and timing information associated with the detected behavior type, each of which corresponds to a portion of the audio data. After each evaluation server generates its evaluation dataset, the evaluation server can communicate the evaluation dataset back to one or more of the application server(s) for further processing.

At block 720, the evaluation datasets generated by the plurality of evaluation servers, each hosting its own behavior detection model, are received by the one or more application server(s) (e.g. by report service 220 of FIG. 2). At block 730, after the one or more application server(s) (e.g. report service 220 of FIG. 2) receives all of the evaluation datasets, it can begin generating a consolidated evaluation dataset. In accordance with various embodiments, the consolidated evaluation dataset is generated by initially cleaning each of the evaluation datasets.

An evaluation dataset received from an evaluation server is cleaned by removing all behavior tags having a zero confidence score associated therewith. Behavior tags having a low or high confidence score remain stored in the evaluation dataset. In some embodiments, the one or more application server(s) can have predefined confidence thresholds for each evaluation server, which define ranges of zero confidence, low confidence, or high confidence, for each behavior tag. By way of non-limiting example, confidence scores for a behavior tag can range between a 0 to 1 value. In this example, a zero confidence score can be given to a behavior tag having a confidence score of 0 to 0.1, a low confidence score can be given to a behavior tag having a confidence score of 0.1 to 0.5, and a high confidence score can be given to a behavior tag having a confidence score of 0.5 to 1. In this regard, the behavior tag cleaning process would remove from evaluation datasets all behavior tags having a zero confidence score, while maintaining other behavior tags having low or high confidence scores.

After each evaluation dataset is cleaned, the consolidated evaluation dataset for the audio data can be generated (e.g. by report service 220 of FIG. 2) by combining all behavior tags from the plurality of evaluation datasets having low or high confidence scores. As described in accordance with FIGS. 4A-4B, the voice scoring service can employ business logic to combine the behavior tags from the cleaned evaluation datasets to generate the consolidated evaluation dataset. In accordance with some embodiments, the business logic can define whether behavior tags from different evaluation servers, having the same behavior type and overlapping in time, should be combined to generate a new behavior tag of that behavior type for the consolidated evaluation dataset.

To facilitate the business logic, an evaluation server or the one or more application server(s) (e.g. report service 220 of FIG. 2) can store a piece of metadata with each behavior tag of a particular behavior type, to indicate whether low confidence behavior tags, overlapping in time, can be combined (e.g. by report service 220 of FIG. 2) with behavior tags of the particular behavior type from other evaluation servers to increase confidence levels. By way of non-limiting example, if the piece of metadata is "true" for overlapping behavior tags of a common behavior type from different evaluation servers: two low confidence behavior tags can be merged to become a high confidence behavior tag; two high confidence behavior tags can be merged and remain a high confidence behavior tag; and one low confidence behavior tag and one high confidence behavior tag can be merged to become a high confidence behavior tag. On the other hand, if the piece of metadata is "false" for any behavior tag of a particular behavior type overlapping with another behavior tag of the particular behavior type from a different evaluation server: two low confidence behavior tags can be merged and will remain low confidence; two high confidence behavior tags can be merged and will remain high confidence; and one low confidence behavior tag and one high confidence behavior tag can be merged to become a high confidence behavior tag. In some embodiments, only high confidence behavior tags may be considered to generate the consolidated evaluation dataset. In this case, a piece of metadata may not be necessary in the behavior tags to determine whether overlapping behavior tags of a common behavior type from different evaluation servers should be merged. For instance, when overlapping behavior tags of a common behavior type are received from different evaluation servers, the high confidence behavior tags can be merged and remain a high confidence behavior tag for the consolidated evaluation dataset.

After the business logic is applied to the behavior tags to generate the consolidated evaluation dataset, the one or more application servers (e.g. report service 220 of FIG. 2) can, at block 740, determine a score for each detected behavior type based on the consolidated evaluation dataset. More specifically, a total duration of all high confidence behavior tags for each behavior type in the consolidated evaluation dataset is determined by calculating a sum of durations for each high confidence behavior tag having a common behavior type. At block 750, and as also described in accordance with FIG. 5, the summed duration of high confidence behavior tags for each behavior type can be compared (e.g. by report service 220 of FIG. 2) to a set of predefined threshold behavior amounts. Depending on which threshold behavior amount the summed duration for a behavior type is associated with can determine a behavior level (e.g. none, low, medium, high) that the detected disruptive behaviors of the behavior type should be associated with. Following the determination of behavior levels for each behavior type, a behavior level score can be given to each behavior type detected in the audio data.

After the voice scoring service determines a behavior level score for each behavior type detected in the audio data, a sum of all behavior level scores across all behavior types can be calculated to determine a total severity score for the audio data. The voice scoring service can then compare the total severity score to a predefined set of severity thresholds to determine a transgression severity level that corresponds to all of the disruptive behavior(s) detected in the audio data.

At block 760, the one or more application servers (e.g. voice scoring service 222 of FIG. 2) can store the transgression severity level in association with the second user account. In some cases, the transgression severity level will always be flagged and saved in association with the second user account. In some other cases, the transgression severity level will be compared to a defined threshold severity level to determine whether the disruptive behavior (and the transgression severity level) should be flagged and saved in association with the second user account. If no disruptive behavior is flagged for the second user account, the evaluation process may conclude and no penalty will be issued. If, however, a disruptive behavior or transgression severity level is flagged, then it is saved to the second user account and a variety of factors may be considered to determine a severity of a penalty given to a user account.

In some embodiments, the one or more application servers (e.g. user administration service 224 of FIG. 2) can analyze the transgression severity level, along with behavioral history (e.g. previous transgressions) associated with the second user account, to issue one or more penalties to the second user account in response to the severity of the transgression having exceeded a threshold severity level. As described herein, penalties may include, by way of example, a temporary ban or a permanent account suspension, among other things, depending on severity and frequency of the offenses associated with the second user account.

Figure 8:
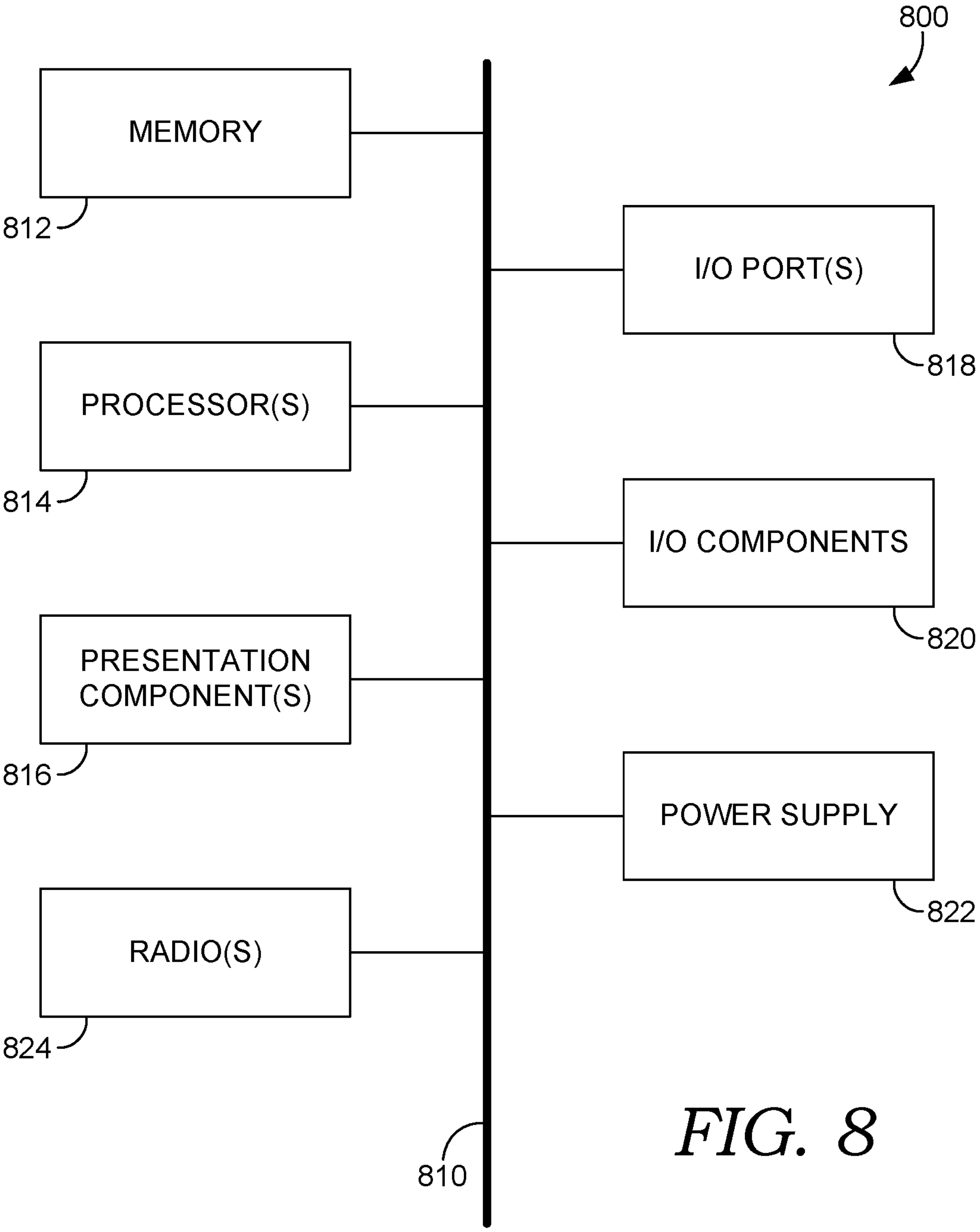
FIG. 8 is a block diagram of an exemplary computing environment suitable for use in implementing some embodiments of the present disclosure.

With reference to FIG. 8, computing device 800 includes a bus 810 that directly or indirectly couples the following devices: memory 812, one or more processors 814, one or more presentation components 816, input/output (I/O) ports 818, input/output components 820, and an illustrative power supply 822. Bus 810 represents what may be one or more buses (such as an address bus, data bus, or combination thereof). Although the various blocks of FIG. 8 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. The inventor recognizes that such is the nature of the art, and reiterates that the diagram of FIG. 8 is merely illustrative of an exemplary computing device that can be used in connection with one or more embodiments of the present disclosure. Distinction is not made between such categories as "workstation," "server," "laptop," "hand-held device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer-storage media in the form of volatile and/or nonvolatile memory. The memory may be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc. The I/O components 820 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 800. The computing device 800 may be equipped with depth cameras, such as stereoscopic camera systems, infrared camera systems, RGB camera systems, touchscreen technology, and combinations of these, for gesture detection and recognition. Additionally, the computing device 800 may be equipped with accelerometers or gyroscopes that enable detection of motion. The output of the accelerometers or gyroscopes may be provided to the display of the computing device 800 to render immersive augmented reality or virtual reality.

A computing device may include a radio 824. The radio 824 transmits and receives radio communications. The computing device may be a wireless terminal adapted to receive communications and media over various wireless networks. Computing device 800 may communicate via wireless policies, such as code-division multiple access ("CDMA"), global system for mobiles ("GSM"), or time-division multiple access ("TDMA"), as well as others, to communicate with other devices. The radio communications may be a short-range connection, a long-range connection, or a combination of both a short-range and a long-range wireless telecommunications connection. When referring to "short" and "long" types of connections, it should be understood that reference may not intend on referring to the spatial relation between two devices. Instead, such terms may generally refer to short range and long range as different categories, or types, of connections (i.e., a primary connection and a secondary connection). A short-range connection may include a Wi-Fi® connection to a device (for example, mobile hotspot) that provides access to a wireless communications network, such as a wireless local area network (WLAN) connection using the 802.11 protocol. A Bluetooth connection to another computing device is a second example of a short-range connection. A long-range connection may include a connection using one or more of CDMA, General Packet Radio Service (GPRS), GSM, TDMA, and 802.16 policies.

As can be understood, embodiments of the present disclosure provide for, among other things, systems and methods for evaluating disruptive behaviors in voice chat audio within online environments, such as multiplayer gaming environments. The present disclosure has been described in relation to particular embodiments, which are intended in all respects to be illustrative rather than restrictive. Alternative embodiments will become apparent to those of ordinary skill in the art to which the present disclosure pertains without departing from its scope.

From the foregoing, it will be seen that embodiments of the present disclosure are one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A method for evaluating disruptive behaviors in video game voice communications, the method being implemented by one or more processors executing instructions stored in memory, the method comprising:

responsive to a report of disruptive behavior associated with a user account, providing audio data associated with the user account to a plurality of behavior detection models adapted to analyze the audio data in parallel and generate a plurality of evaluation datasets based on the audio data, the plurality of evaluation datasets having a plurality of behavior tags, each behavior tag of the plurality of behavior tags defining one of a plurality of behavior types;

receiving the plurality of evaluation datasets from the plurality of behavior detection models, each evaluation dataset of the plurality of evaluation datasets having a corresponding portion of the plurality of behavior tags and being received from one of the plurality of behavior detection models;

generating a consolidated evaluation dataset based on the received plurality of evaluation datasets, the consolidated evaluation dataset having a new set of behavior tags defined based on the plurality of behavior tags;

determining a score for each behavior type of the plurality of behavior types based on the new set of behavior tags;

determining a transgression severity level based at least in part on the scores determined for the plurality of behavior types;

storing the transgression severity level in association with the user account based at least in part on a severity threshold; and executing an administrative action in association with the user account based on a determination that the transgression severity level exceeds the severity threshold.

2. The method of claim 1, wherein each behavior tag of the plurality of behavior tags is associated with one of a plurality of confidence levels, and the consolidated evaluation dataset is generated based on the plurality of confidence levels.

3. The method of claim 1, wherein each behavior tag of the plurality of behavior tags is associated with timing information, and the consolidated evaluation dataset is generated based further on the timing information.

4. The method of claim 3, wherein the timing information corresponds to a start time and a duration of the behavior tag.

5. The method of claim 4, wherein the score is determined based on a summed duration of the new set of behavior tags compared to a set of threshold durations defined for each behavior type of the plurality of behavior types.

6. The method of claim 1, wherein the plurality of behavior detection models are each trained on disparate sets of training data.

7. The method of claim 1, wherein the audio data is associated with a single match.

8. The method of claim 1, wherein the transgression severity level is determined based further on a sum of the scores determined for the plurality of behavior types.

9. The method of claim 1, wherein each behavior detection model of the plurality of behavior detection models is adapted to independently detect the plurality of behavior types from the audio data, and wherein the consolidated evaluation dataset is generated by combining behavior tags of a common behavior type from different behavior detection models of the plurality of behavior detection models.

10. A method for evaluating disruptive behaviors in video game voice communications, the method being implemented by one or more processors executing instructions stored in memory, the method comprising:

responsive to a report of disruptive behavior associated with a user account, providing audio data associated with the user account to at least a first behavior detection model and a second behavior detection model, wherein the first and second behavior detection models are adapted to analyze the audio data in parallel and generate evaluation datasets having behavior tags determined based on the audio data;

receiving, from the first and second behavior detection models, respectively, a first evaluation dataset having at least a first set of behavior tags of a first behavior type, and a second evaluation dataset having at least a second set of behavior tags of the first behavior type;

generating a third evaluation dataset based at least in part on the first and second evaluation datasets, the third evaluation dataset having at least a third set of behavior tags of the first behavior type;

determining a score for the first behavior type based on a summed duration of the third set of behavior tags compared to a set of threshold durations defined for the first behavior type;

determining a transgression severity level based at least in part on the score for the first behavior type;

storing the transgression severity level in association with the user account based at least in part on a predefined severity threshold; and executing an administrative action in association with the user account based on a determination that the transgression severity level exceeds the predefined severity threshold.

11. The method of claim 10, further comprising:

cleaning the first and second evaluation datasets based at least in part on the first and second sets of behavior tags.

12. The method of claim 11, wherein the third evaluation dataset is generated after the first and second evaluation datasets are cleaned.

13. The method of claim 11, wherein the first and second evaluation datasets are cleaned based at least in part on confidence levels and timing information associated with the first and second sets of behavior tags.

14. The method of claim 10, wherein the third set of behavior tags is generated based at least in part on the first and second sets of behavior tags.

15. The method of claim 10, further comprising:

executing an administrative action in association with the user account based on the report of disruptive behavior and the transgression severity level stored in association with the user account.

16. A computerized system for evaluating disruptive behaviors in video game voice communications, comprising:

one or more processors, and one or more computer storage media storing computer-usable instructions that, when used by the one or more processors, cause the one or more processors to:

provide audio data associated with a user account to a plurality of evaluation servers adapted to analyze the audio data in parallel and generate a plurality of evaluation datasets based on the audio data, the plurality of evaluation datasets having a plurality of behavior tags, each behavior tag of the plurality of behavior tags defining one of a plurality of detected behavior types, a confidence score, and timing information;

receive the plurality of evaluation datasets from the plurality of evaluation servers, each evaluation dataset of the plurality of evaluation datasets having a corresponding portion of the plurality of behavior tags and being received from one of the plurality of evaluation servers;

generate a consolidated evaluation dataset based on the received plurality of evaluation datasets, the consolidated evaluation dataset having a new set of behavior tags defined based on the plurality of detected behavior types, the confidence scores, and the timing information defined in the plurality of behavior tags;

determine a score for each detected behavior type of the plurality of detected behavior types based on the timing information defined in the new set of behavior tags and a set of threshold durations defined for each detected behavior type of the plurality of detected behavior types;

determine a transgression severity level based on the scores determined for the plurality of detected behavior types;

store the transgression severity level in association with the user account based at least in part on a predefined severity threshold; and execute an administrative action in association with the user account based on a determination that the transgression severity level exceeds the predefined severity threshold.

17. The system of claim 16, wherein the instructions further cause the one or more processors to:

clean the plurality of evaluation datasets based on the confidence scores defined in the plurality of behavior tags.

18. The system of claim 17, wherein the plurality of evaluation datasets is cleaned by at least removing a portion of the plurality of behavior tags having a zero confidence score.

19. The system of claim 16, wherein the timing information corresponds to a start time and end time of the behavior tag.

20. The system of claim 16, wherein each evaluation server of the plurality of evaluation servers comprises a unique behavior detection model.

* * * * *